United States Patent
Zhao et al.

(10) Patent No.: US 9,702,968 B2
(45) Date of Patent: Jul. 11, 2017

(54) OPTIMAL VIBRATION CONTROL FOR A WELLBORE LOGGING TOOL

(71) Applicant: HALLIBURTON ENERGY SERVICES, INC., Houston, TX (US)

(72) Inventors: Yiming Zhao, Katy, TX (US);
Xingyong Song, Houston, TX (US);
Jason D. Dykstra, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/898,134

(22) PCT Filed: Aug. 7, 2014

(86) PCT No.: PCT/US2014/050060
§ 371 (c)(1),
(2) Date: Dec. 13, 2015

(87) PCT Pub. No.: WO2016/022119
PCT Pub. Date: Feb. 11, 2016

(65) Prior Publication Data
US 2016/0209503 A1    Jul. 21, 2016

(51) Int. Cl.
*G01S 15/88* (2006.01)
*G01S 7/52* (2006.01)
(Continued)

(52) U.S. Cl.
CPC .......... *G01S 7/52004* (2013.01); *E21B 23/14* (2013.01); *E21B 47/011* (2013.01);
(Continued)

(58) Field of Classification Search
CPC ... G01V 1/50; G01V 1/44; G01V 1/40; G01V 1/46; G01V 1/42; G01V 1/48;
(Continued)

(56) References Cited

U.S. PATENT DOCUMENTS 5,182,774 A * 1/1993 Bourk .................. H04R 1/1083
379/430
6,671,224 B1   12/2003 Pabon
(Continued)

OTHER PUBLICATIONS

International Search Report and Written Opinion issued in related PCT Application No. PCT/US2014/050060, mailed on May 7, 2015 (12 pages).
(Continued)

*Primary Examiner* — Luke Ratcliffe
*Assistant Examiner* — Amie M N'Dure
(74) *Attorney, Agent, or Firm* — Benjamin Fite; Baker Botts L.L.P.

(57) ABSTRACT

In accordance with some embodiments of the present disclosure, a method for optimal vibration control for a wellbore logging tool is disclosed. The method may include retrieving a plurality of optimal drive signals, each of the optimal drive signals corresponding to at least one of a plurality of wellbore environmental conditions and calculated to minimize vibration of a wellbore logging tool. The method may further include obtaining an initial wellbore environmental condition. The method may include matching the initial wellbore environmental condition to an optimal drive signal stored in the plurality of optimal drive signals. The method may also include generating a drive signal for the wellbore logging tool based on the matching.

23 Claims, 5 Drawing Sheets

(51) Int. Cl.
*E21B 23/14* (2006.01)
*E21B 47/01* (2012.01)
*E21B 47/12* (2012.01)
*E21B 49/00* (2006.01)
*G01V 1/52* (2006.01)

(52) U.S. Cl.
CPC .............. *E21B 47/12* (2013.01); *E21B 49/00* (2013.01); *G01S 15/88* (2013.01); *G01V 1/52* (2013.01)

(58) Field of Classification Search
CPC .. G01V 1/306; G01V 1/52; G01V 2210/1429; G01V 1/181; G01V 1/226; G01V 1/523; G01V 2210/6246; G01V 2210/626; G01V 11/00; G01V 1/02
USPC ... 367/1–2, 7, 12–15, 26–28, 33–37, 81–87, 367/117–197
See application file for complete search history.

(56) References Cited

U.S. PATENT DOCUMENTS

| | | | |
|---|---|---|---|
| 6,837,332 B1 | 1/2005 | Rodney | |
| 6,968,909 B2 | 11/2005 | Aldred et al. | |
| 7,639,562 B2 | 12/2009 | Patterson et al. | |
| 8,860,416 B2* | 10/2014 | Bittar | G01V 3/28 324/338 |
| 2003/0168257 A1* | 9/2003 | Aldred | E21B 49/003 175/24 |
| 2006/0195307 A1* | 8/2006 | Huang | E21B 10/00 703/7 |
| 2009/0012711 A1* | 1/2009 | Harmon | G01V 1/42 702/9 |
| 2009/0229882 A1* | 9/2009 | Quernheim | E21B 47/01 175/26 |
| 2011/0298461 A1* | 12/2011 | Bittar | G01V 3/28 324/338 |
| 2013/0032402 A1* | 2/2013 | Byreddy | E21B 44/00 175/27 |
| 2013/0092441 A1* | 4/2013 | Hummes | E21B 17/07 175/56 |

OTHER PUBLICATIONS

International Preliminary Report on Patentability issued in related Application No. PCT/US2014/050060, mailed Feb. 16, 2017 (7 pages).

* cited by examiner

OPTIMAL VIBRATION CONTROL FOR A WELLBORE LOGGING TOOL

CROSS-REFERENCE TO RELATED APPLICATION

The present application is a U.S. National Stage Application of International Application No. PCT/US2014/050060 filed Aug. 7, 2014, which is incorporated herein by reference in its entirety for all purposes.

TECHNICAL FIELD

The present disclosure relates generally to well drilling and hydrocarbon recovery operations and, more particularly, to a system and method of optimal vibration control for a wellbore logging tool.

BACKGROUND

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

When performing subterranean operations, it is often desirable to obtain information about the subterranean formation. One method of obtaining information about the formation is the use of a sonic well logging tool. A sonic well logging tool may emit an acoustic signal, which propagates through the formation to at least one receiver. The travel time of the acoustic signal from the tool to the receiver may be used to calculate the speed of the acoustic tone through the formation. Properties of the formation may be determined by comparing the speed of the acoustic tone to the speed of sound through various types of rock and fluid that may be encountered in subterranean operations.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
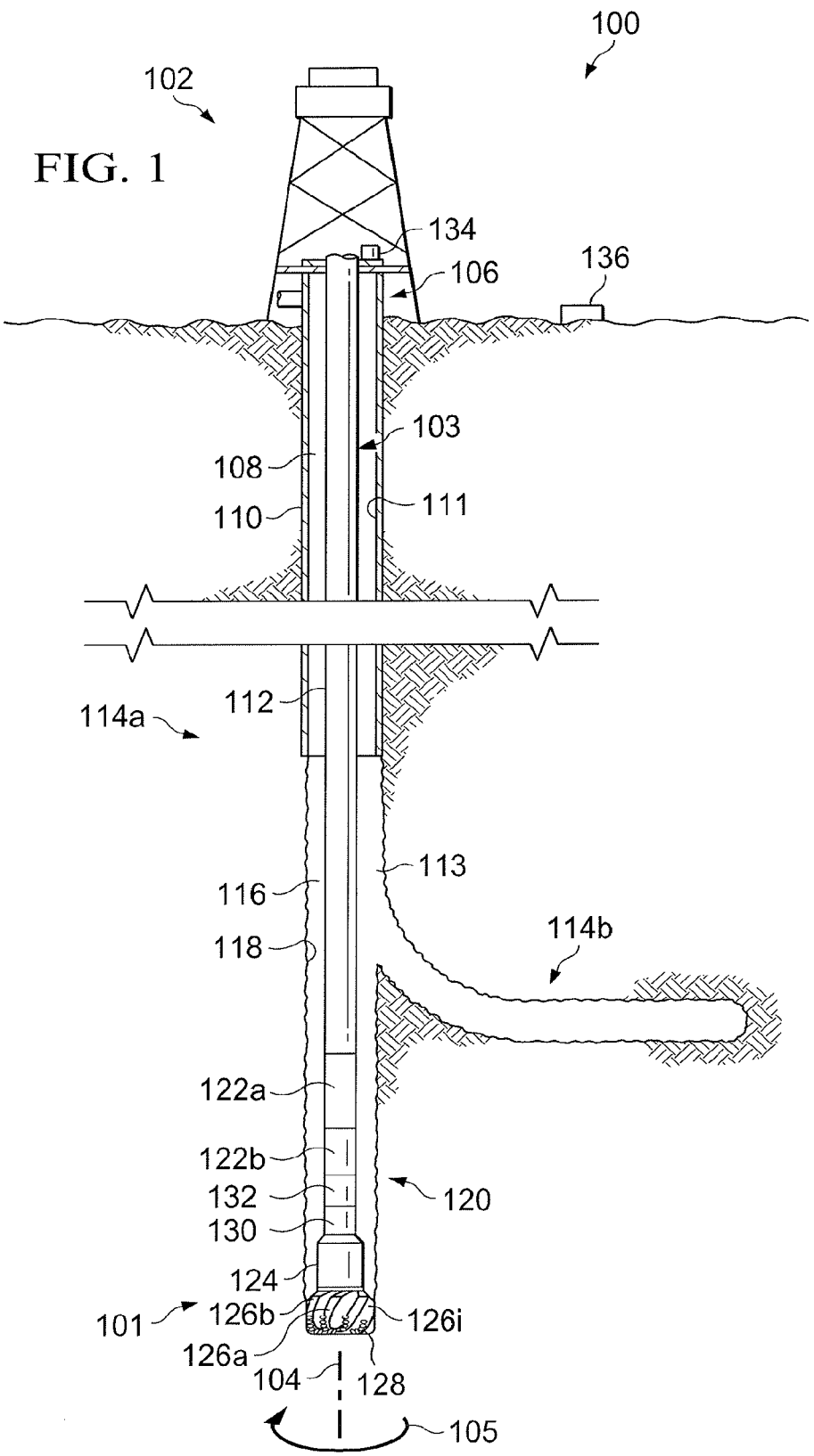
FIG. 1 illustrates an elevation view of an example embodiment of a drilling system used in an illustrative logging-while-drilling (LWD) environment, in accordance with some embodiments of the present disclosure.
Figure 2:
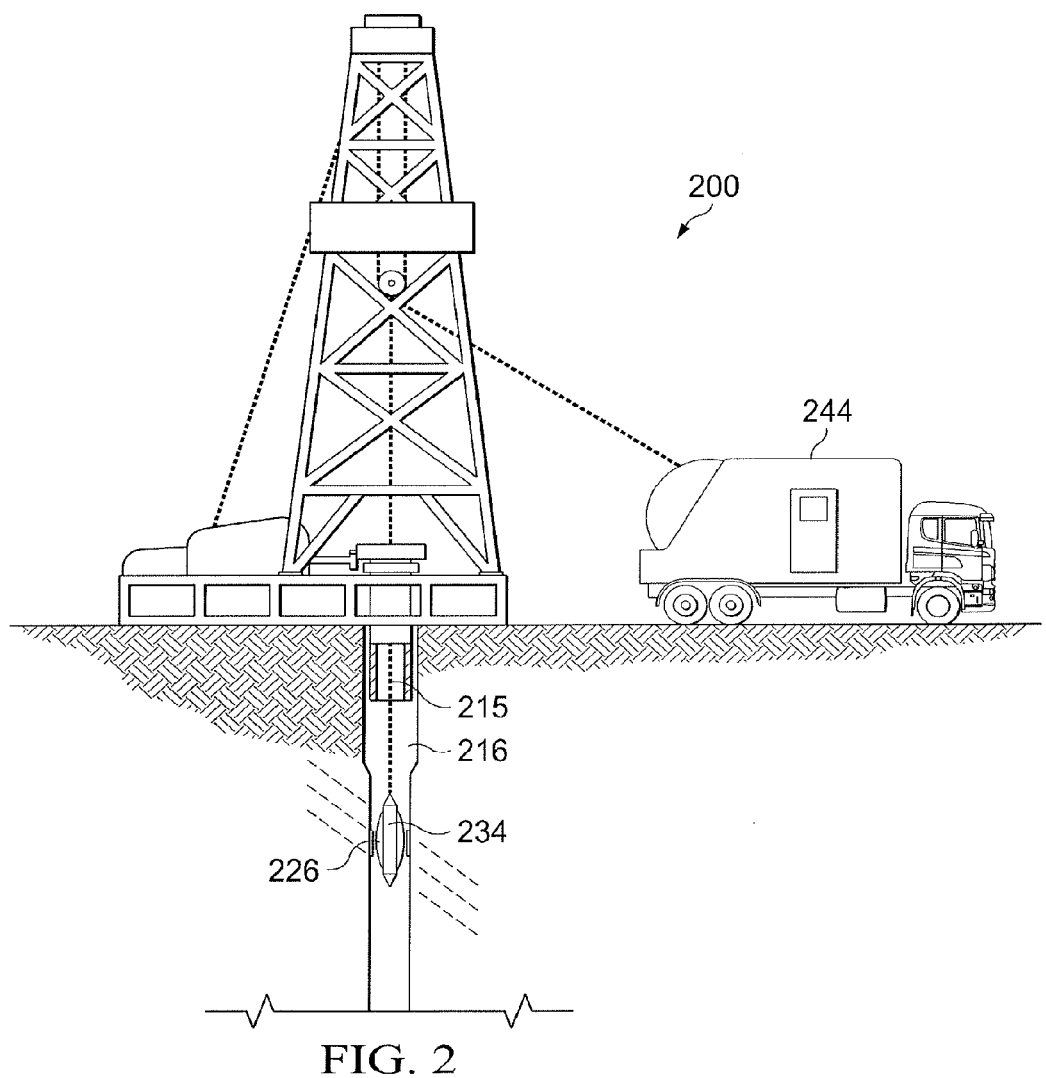
FIG. 2 illustrates an elevation view of an example embodiment of a downhole system used in an illustrative logging environment with the drill string removed, in accordance with some embodiments of the present disclosure.

The present disclosure describes an automated control system and method to optimize vibration control in a wellbore logging tool. The wellbore logging tool may be located on a drill string, as shown in FIG. 1, or on a wireline, as shown in FIG. 2. The wellbore logging tool may be any suitable type of wellbore logging tool, including a sonic logging tool that emits a signal in the form of an acoustic waveform. To improve the efficiency of a subterranean operation, it may be desirable to avoid outside acoustic disturbances, such as vibration or oscillation of the sonic logging tool. In some embodiments, components of the sonic logging tool, such as a transmitter or an actuator, may oscillate due to excitations during the process of generating the acoustic signal. The oscillation of the components of the sonic logging tool, also known as "ringing," may be in the frequency range of the emitted acoustic signal. The ringing may result in lower quality data, may increase the time required to perform the logging, and may require more energy input into the logging tool. Accordingly, a system and method may be designed in accordance with the teachings of the present disclosure to reduce the ringing of the logging tool components and improve the quality of the acoustic signal emitted by the sonic logging tool, reduce the time and cost of performing wellbore logging, and reduce the total energy input requirements for the logging tool. Although the automated control system and method described herein are directed to optimization of vibration control in a sonic logging tool, the control system and method may be adapted to optimize other aspects of a subterranean operation including other types of wellbore logging tools.

To facilitate a better understanding of the present disclosure, the following examples of certain embodiments are given. In no way should the following examples be read to limit, or define, the scope of the disclosure. Embodiments of the present disclosure and its advantages are best understood by referring to FIGS. 1 through 6, where like numbers are used to indicate like and corresponding parts.

Referring now to the drawings, in which FIG. 1 illustrates an elevation view of an example embodiment of drilling system 100 used in an illustrative logging-while-drilling (LWD) environment, in accordance with some embodiments of the present disclosure. Modern petroleum drilling and production operations use information relating to parameters and conditions downhole. Several methods exist for collecting downhole information during subterranean operations, including LWD. In LWD, data is typically collected during a drilling process, thereby avoiding any need to remove the drilling assembly to insert a wireline logging tool. LWD consequently allows an operator of a drilling system to make accurate real-time modifications or corrections to optimize performance while minimizing down time. In wireline logging, a logging tool may be suspended in the wellbore from a wireline and may take measurements of the wellbore and subterranean formation.

Drilling system 100 may include well surface or well site 106. Various types of drilling equipment such as a rotary table, drilling fluid pumps and drilling fluid tanks (not expressly shown) may be located at well surface or well site 106. For example, well site 106 may include drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles and drilling barges (not expressly shown).

Drilling system 100 may also include drill string 103 associated with drill bit 101 that may be used to form a wide variety of wellbores or bore holes such as generally vertical wellbore 114a or generally horizontal 114b wellbore or any other angle, curvature, or inclination. Various directional drilling techniques and associated components of bottom hole assembly (BHA) 120 of drill string 103 may be used to form horizontal wellbore 114b. For example, lateral forces may be applied to BHA 120 proximate kickoff location 113 to form generally horizontal wellbore 114b extending from generally vertical wellbore 114a. The term "directional drilling" may be used to describe drilling a wellbore or portions of a wellbore that extend at a desired angle or angles relative to vertical. The desired angles may be greater than normal variations associated with vertical wellbores. Direction drilling may also be described as drilling a wellbore deviated from vertical. The term "horizontal drilling" may be used to include drilling in a direction approximately ninety degrees (90°) from vertical but may generally refer to any wellbore not drilled only vertically. "Uphole" may be used to refer to a portion of wellbore 114a, 114b that is closer to well surface 106 via the path of the wellbore 114a, 114b. "Downhole" may be used to refer to a portion of wellbore 114a, 114b that is further from well surface 106 via the path of wellbore 114a, 114b.

BHA 120 may be formed from a wide variety of components configured to form wellbore 114a. For example, components 122a, and 122b of BHA 120 may include, but are not limited to, drill bits (e.g., drill bit 101), coring bits, drill collars, rotary steering tools, directional drilling tools, downhole drilling motors, reamers, hole enlargers or stabilizers. The number and types of components 122a, 122b included in BHA 120 may depend on anticipated downhole drilling conditions and the type of wellbore that will be formed by drill string 103 and rotary drill bit 101. BHA 120 may also include various types of well logging tools and other downhole tools associated with directional drilling of a wellbore. Examples of logging tools and/or directional drilling tools may include, but are not limited to, acoustic, neutron, gamma ray, density, photoelectric, nuclear magnetic resonance, induction, resistivity, caliper, coring, seismic, rotary steering, and/or any other commercially available well tools. Further, BHA 120 may also include a rotary drive (not expressly shown) connected to components 122a, and 122b and which rotates at least part of drill string 103 together with components 122a, and 122b.

In the illustrated embodiment, logging tool 130 may be integrated with BHA 120 near drill bit 101 (e.g., within a drilling collar, for example a thick-walled tubular that provides weight and rigidity to aid in the drilling process, or a mandrel). In certain embodiments, drilling system 100 may include control unit 134, positioned at the surface, in drill string 103 (e.g., in BHA 120 and/or as part of logging tool 130), or both (e.g., a portion of the processing may occur downhole and a portion may occur at the surface). Control unit 134 may include a control system or a control algorithm for logging tool 130. Control unit 134 may be communicatively coupled to logging tool 130 and, in one or more embodiments, may be a component of logging tool 130. In certain embodiments, a control system, an algorithm, or a set of machine-readable instructions may cause control unit 134 to generate and transmit control or drive signals to one or more elements of logging tool 130. For example, control unit 134 may generate a drive signal for logging tool 130 based on a dataset of optimal drive signals, as discussed in more detail with reference to FIGS. 4 and 5.

Logging tool 130 may be integrated into drilling system 100 at any point along the drill string 103. Logging tool 130 may include receivers (e.g., antennas) and/or transmitters capable of receiving and/or transmitting one or more acoustic signals. The transmitter may include any type of transmitter suitable for generating an acoustic signal, such as a solenoid or piezoelectric shaker. In some embodiments, logging tool 130 may include a transceiver array that functions as both a transmitter and a receiver. A drive signal may transmitted by control unit 134 to logging tool 130 to cause logging tool 130 to emit an acoustic signal. As the bit extends wellbore 114a through the formations, logging tool 130 may collect measurements relating to various formation properties as well as the tool orientation and position and various other drilling conditions. The orientation measurements may be performed using an azimuthal orientation indicator, which may include magnetometers, inclinometers, and/or accelerometers, though other sensor types such as gyroscopes may be used in some embodiments. In some embodiments, logging tool 130 may include sensors to record the environmental conditions in wellbore 114a, such as the ambient pressure, ambient temperature, the resonance frequency, or the phase of the vibration. Telemetry sub 132 may be included on drill string 103 to transfer tool measurements to surface receiver 136 and/or to receive commands from control unit 134 (when control unit 134 is at least partially located on the surface). Telemetry sub 132 may transmit downhole data to a surface receiver 136 and/or receive commands from the surface receiver 30. Telemetry sub 132 may transmit data through one or more wired or wireless communications channels (e.g., wired pipe or electromagnetic propagation). Alternatively, telemetry sub 132 may transmit data as a series of pressure pulses or modulations within a flow of drilling fluid (e.g., mud-pulse or mud-siren telemetry), or as a series of acoustic pulses that propagate to the surface through a medium, such as the drill string. Sensors included in logging tool 130 may provide information used to perform measurements on the vibration and/or motion of logging tool 130. The measurements may be used to determine the optimal drive signal for logging tool 130 and reduce the amount of ringing associated with logging tool 130. The optimal drive signal may be based on the environmental conditions in wellbore 114.

Drilling system 100 may also include facilities (not expressly shown) that may include computing equipment configured to collect, process, and/or store the measurements received from receivers on logging tool 130 and/or surface receiver 136. The facilities may be located onsite or offsite.

Wellbore 114a may be defined in part by casing string 110 that may extend from well surface 106 to a selected downhole location. Portions of wellbore 114a, as shown in FIG. 1, that do not include casing string 110 may be described as "open hole." Various types of drilling fluid may be pumped from well surface 106 through drill string 103 to attached drill bit 101. The drilling fluids may be directed to flow from drill string 103 to respective nozzles passing through rotary drill bit 101. The drilling fluid may be circulated back to well surface 106 through annulus 108 defined in part by outside diameter 112 of drill string 103 and inside diameter 118 of wellbore 114a. Inside diameter 118 may be referred to as the "sidewall" of wellbore 114a. Annulus 108 may also be defined by outside diameter 112 of drill string 103 and inside diameter 111 of casing string 110. Open hole annulus 116 may be defined as sidewall 118 and outside diameter 112.

Drilling system 100 may also include rotary drill bit ("drill bit") 101. Drill bit 101 may include one or more blades 126a, 126b, 126i that may be disposed outwardly from exterior portions of rotary bit body 124 of drill bit 101. Blades 126a, 126b, 126i may be any suitable type of projections extending outwardly from rotary bit body 124. Drill bit 101 may rotate with respect to bit rotational axis 104 in a direction defined by directional arrow 105. Blades 126a, 126b, 126i may include one or more cutting elements 128 disposed outwardly from exterior portions of each blade 126a, 126b, 126i. Blades 126a, 126b, 126i may also include one or more depth of cut controllers (not expressly shown) configured to control the depth of cut of cutting elements 128. Blades 126a, 126b, 126i may further include one or more gage pads (not expressly shown) disposed on blades 126a, 126b, 126i. Drill bit 101 may be designed and formed in accordance with teachings of the present disclosure and may have many different designs, configurations, and/or dimensions according to the particular application of drill bit 101.

At various times during the drilling process, drill string 103 may be removed from wellbore 114a and a wellbore logging tool may be used to obtain information about the subterranean formation. FIG. 2 illustrates an elevation view of an example embodiment of downhole system 200 used in an illustrative logging environment with the drill string removed, in accordance with some embodiments of the present disclosure. Subterranean operations may be conducted using wireline system 234 once the drill string has been removed. However, at times, some or all of the drill string may remain in wellbore 114a during logging with wireline system 234. Wireline system 234 may include one or more logging tools 226 that may be suspended into wellbore 216 by conveyance 215 (e.g., a cable, slickline, coiled tubing, or the like). Logging tool 226 may be similar to logging tool 130, as described with reference to FIG. 1. Logging tool 226 may be communicatively coupled to conveyance 215. Conveyance 215 may contain conductors for transporting power to wireline system 234 and telemetry from logging tool 226 to logging facility 244. Alternatively, conveyance 215 may lack a conductor, as is often the case using slickline or coiled tubing, and wireline system 234 may contain a control unit similar to control unit 134, shown in FIG. 1, that contains memory, one or more batteries, and/or one or more processors for performing operations and storing measurements. In certain embodiments, system 200 may include a control unit, positioned at the surface, in the wellbore (e.g., in conveyance 215 and/or as part of logging tool 226) or both (e.g., a portion of the processing may occur downhole and a portion may occur at the surface). The control unit may include a control system or a control algorithm for logging tool 226. The control unit may be communicatively coupled to logging tool 226 and, in one or more embodiments, may be a component of logging tool 226. In certain embodiments, a control system, an algorithm, or a set of machine-readable instructions may cause the control unit to generate and transmit an input signal to one or more elements of logging tool 226. The input signal may be a signal used to generate the acoustic signal. Logging facility 244 (shown in FIG. 2 as a truck, although it may be any other structure) may collect measurements from logging tool 226, and may include computing facilities for controlling, processing, or storing the measurements gathered by logging tool 226. The computing facilities may be communicatively coupled to logging tool 226 by way of conveyance 215 and may operate similarly to control unit 134 and/or surface receiver 136, as shown in FIG. 1. An example of a computing facility is described with more detail with reference to FIGS. 3 and 4.

While performing a logging operation, logging tool 130, as shown in FIG. 1, or logging tool 226, as shown in FIG. 2 may oscillate, or ring, after emitting an acoustic signal. The ringing may be in the range of the acoustic signal emitted by the logging tool and may decrease the quality of the acoustic signal. The decrease in signal quality may increase the logging time or may result in higher energy requirements for the logging tool. Therefore, it may be advantageous to reduce the ringing of the logging tool, as discussed in further detail with respect to FIGS. 4 and 5. For example, a system or method may dampen the ringing of logging tool 130, as shown in FIG. 1, or logging tool 226, as shown in FIG. 2, and may improve the quality of the acoustic signal. One method for dampening the ringing of logging tool 130 or logging tool 226 may be through the use of a dataset of optimal drive signals. The environmental conditions in the wellbore 114a may influence the damping characteristics of one or more transmitters in logging tool 130 or logging tool 226, therefore the dataset of optimal drive signals may be calculated based on environmental conditions in the wellbore 114a. The dataset of optimal drive signals and measurements of the current environmental conditions may be used to select a drive signal that will dampen the ringing of logging tool 130 or logging tool 226. As such, systems and methods designed according to the present disclosure may enable more accurate and more efficient measurements of the subterranean formation.

Figure 3:
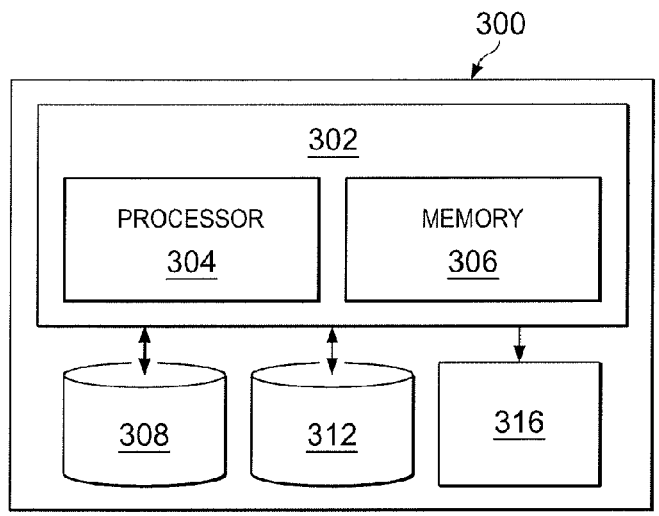
FIG. 3 illustrates a block diagram of an exemplary modeling system for a wellbore logging tool, in accordance with some embodiments of the present disclosure.

FIG. 3 illustrates a block diagram of an exemplary logging tool modeling system 300, in accordance with some embodiments of the present disclosure. Logging tool modeling system 300 may be configured to perform modeling for optimal vibration control for a wellbore logging tool, such as logging tool 130 or logging tool 226. Logging tool modeling system 300 may be used to perform the steps of method 500 as described with respect to FIG. 5. In some embodiments, logging tool modeling system 300 may include logging tool modeling module 302. Logging tool modeling module 302 may include any suitable components. For example, in some embodiments, logging tool modeling module 302 may include processor 304. Processor 304 may include, for example a microprocessor, microcontroller, digital signal processor (DSP), application specific integrated circuit (ASIC), or any other digital or analog circuitry configured to interpret and/or execute program instructions and/or process data. In some embodiments, processor 304 may be communicatively coupled to memory 306. Processor 304 may be configured to interpret and/or execute program instructions and/or data stored in memory 306. Program instructions or data may constitute portions of software for carrying out modeling of the dynamics of a wellbore logging tool, as described herein. Memory 306 may include any system, device, or apparatus configured to hold and/or house one or more memory modules; for example, memory 306 may include read-only memory, random access memory, solid state memory, or disk-based memory. Each memory module may include any system, device or apparatus configured to retain program instructions and/or data for a period of time (e.g., computer-readable non-transitory media).

Logging tool modeling system 300 may further include parameter database 308. Parameter database 308 may be communicatively coupled to logging tool modeling module 302 and may provide parameters in response to a query or call by logging tool modeling module 302. Parameter database 308 may be implemented in any suitable manner, such as by parameters, functions, definitions, instructions, logic, or code, and may be stored in, for example, a database, file, application programming interface, library, shared library, record, data structure, service, software-as-service, or any other suitable mechanism. Parameter database 308 may specify any suitable parameters that may impact the dynamics of a logging tool, such as the ambient pressure of the wellbore (e.g., wellbore 114a), and the resonance period of the logging tool (e.g., logging tool 130 or logging tool 226).

Logging tool modeling system 300 may further include logging tool dynamics database 312. Logging tool dynamics database 312 may be communicatively coupled to logging tool modeling module 302 and may provide logging tool dynamics in response to a query or call by logging tool modeling module 302. Logging tool dynamics database 312 may be implemented in any suitable manner, such as by parameters, functions, definitions, instructions, logic, or code, and may be stored in, for example, a database, file, application programming interface, library, shared library, record, data structure, service, software-as-service, or any other suitable mechanism. Logging tool dynamics database 312 may specify any suitable properties of the logging tool that may be of interest for controlling the vibration of the logging tool, such as the acceleration, speed, and energy consumption rate of the logging tool (e.g., logging tool 130 or logging tool 226). Although logging tool modeling system 300 is illustrated as including two databases, logging tool modeling system 300 may contain any suitable number of databases.

In some embodiments, logging tool modeling module 302 may be configured to perform modeling for optimizing vibration control for a wellbore logging tool. For example, logging tool modeling module 302 may be configured to import one or more instances of parameter database 308 and/or one or more instances of logging tool dynamics database 312. Parameter database 308 and/or logging tool dynamics database 312 may be stored in memory 306. Logging tool modeling module 302 may be further configured to cause processor 304 to execute program instructions operable to perform modeling of the vibration of a wellbore logging tool. For example, processor 304 may, based on parameter database 308 and logging tool dynamics database 308, generate a model of logging tool dynamics as a result of vibration of the system during and after generating an acoustic signal and may determine the optimal drive signals for the logging tool to dampen the vibration, as discussed in further detail with reference to FIG. 4. For example, processor 304 may determine the optimal drive signals for logging tool 130 or logging tool 226, as shown in FIGS. 1 and 2.

Logging tool modeling module 302 may be communicatively coupled to one or more displays 316 such that information processed by logging tool modeling module 302 (e.g., optimal drive signals for the logging tool) may be conveyed to operators of drilling and logging equipment.

Modifications, additions, or omissions may be made to FIG. 3 without departing from the scope of the present disclosure. For example, FIG. 3 shows a particular configuration of components of logging tool modeling system 300. However, any suitable configurations of components may be used. For example, components of logging tool modeling system 300 may be implemented either as physical or logical components. Furthermore, in some embodiments, functionality associated with components of logging tool modeling system 300 may be implemented in special purpose circuits or components. In other embodiments, functionality associated with components of logging tool modeling system 300 may be implemented in configurable general purpose circuit or components. For example, components of logging tool modeling system 300 may be implemented by configure computer program instructions. Logging tool modeling system 300 or components thereof can be located at the surface, downhole (e.g., in the BHA and/or in the logging tool), or some combination of both locations (e.g., certain components could be disposed at the surface and certain components could be disposed downhole, where the surface components are communicatively coupled to the downhole components).

Figure 4:
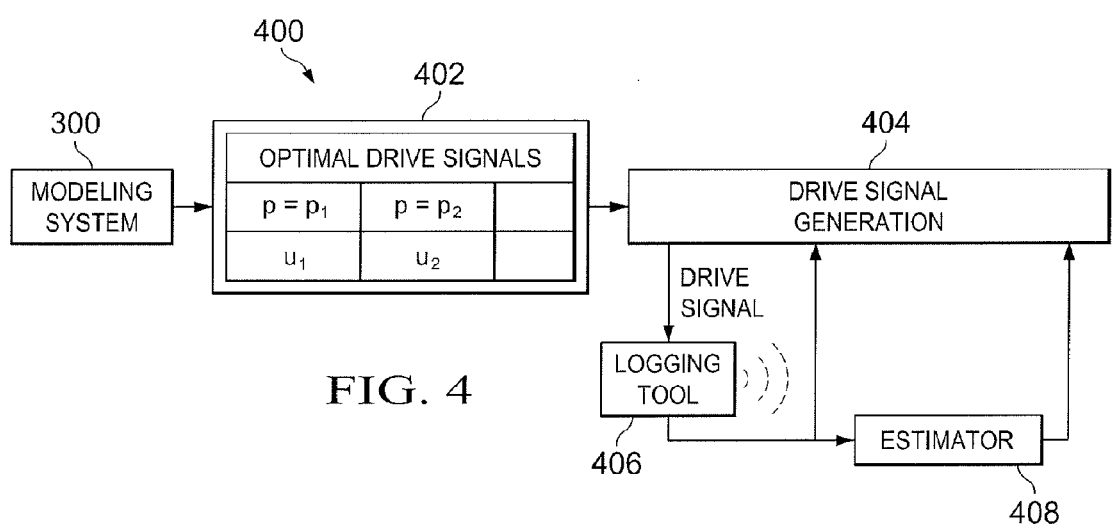
FIG. 4 illustrates a vibration control system for a wellbore logging tool, in accordance with some embodiments of the present disclosure.

Logging tool modeling system 300 may be a component of a system used to provide vibration control for a logging tool. FIG. 4 illustrates a logging tool vibration control system 400, in accordance with some embodiments of the present disclosure. System 400 may include logging tool modeling system 300, optimal drive signals dataset 402, drive signal generator 404, logging tool 406, and estimator 408.

Logging tool modeling system 300, as described in FIG. 3, may generate optimal drive signals dataset 402. As part of the process of generating optimal drive signals dataset 402, logging tool modeling system 300 may create a model of the dynamics of logging tool 406, such as logging tool dynamics database 312, as shown in FIG. 3. In some embodiments, the movements, of a logging tool may be modeled as a linear time-invariant system such that the system behaves linearly and the behavior does not explicitly depend on time. Modeling the logging tool as a linear system may be appropriate due to the linear behavior of the mechanical components of the logging tool. The dynamics of logging tool 406 may represent the effects of a force or signal on the motion of logging tool 406. For example, the model may correlate the motion of logging tool 406 as a result of emitting an acoustic signal. In some embodiments, the dynamics of logging tool 406 may be based on experimental results. For example, experiments may be performed to model the motion of logging tool 406 that occurs when various drive signals are used to excite logging tool 406. The dynamics of logging tool 406 may be represented in a variety of equivalent forms, such as by transfer functions or state space models. For example, the linear dynamics of logging tool 406 using a state-space representation may take the following form:

$$\dot{X}(t)=A(p)X(t)+B(p)u(t) \quad (1)$$

$$Y(t)=C(p)X(t)+D(p)u(t) \quad (2)$$

where
t=time;
X=states of logging tool 406 dynamics;
u=inputs to logging tool 406;
p=set of parameters describing the properties of logging tool 406;
Y=outputs of interest of logging tool 406; and
A, B, C, D=matrices describing dynamics of logging tool 406.

The properties described by matrices A, B, C, and D may include any suitable property of logging tool 406, such as the damping ratio, stiffness, mass of the logging tool, and/or the amplifier gain. To generate models of the dynamics of logging tool 406, logging tool modeling system 300 may choose an operating point around which to linearize the system. In some embodiments, the dynamics of logging tool 406 may not be linear. In nonlinear embodiments, the model may consist of discrete sets of linear equations across the operating range of logging tool 406. The discrete equations may be combined to calculate optimal drive signal dataset 402.

Logging tool modeling system 300 may generate a database of parameters that cover a potential range of potential parameters of logging tool 406, such as parameter database 308 as shown in FIG. 3. The dataset may include possible parameters that may be experienced by logging tool 406, such as the resonance period of logging tool 406. In some embodiments, the database may be a database of measurements instead of a database of parameters. A database of measurements may contain a set of potential measurements that may be recorded by logging tool 406 while logging tool 406 is in operation, such as the ambient temperature, ambient pressure, the resonance frequency, the phase of the vibration or any other condition in the wellbore that may impact the vibration of logging tool 406. A database of measurements may be used in the same way a dataset of parameters may be used. In embodiments utilizing a database of measurements, estimator 408 may not be included in system 400.

Logging tool modeling system 300 may use the database of parameters and the dynamics of logging tool 406 to calculate the values to include in optimal drive signals dataset 402. Optimal drive signals dataset 402 may be a matrix or table containing optimal drive signal values corresponding to values in the database of parameters. For example, for a given resonance period of logging tool 406, optimal drive signals dataset 402 may contain an optimal drive signal corresponding to the given resonance period. Optimal drive signals dataset 402 may include an optimal drive signal for each value in the database of parameters. A value in the database may be a function of a measurement recorded in the wellbore, such as pressure, temperature, resonance frequency, or phase of the vibration, or may be a function of a combination of measurements recorded in the wellbore. A signal in optimal drive signals database 402 may be calculated by:

$$u_i^* = \min_{u_i^*} J(X, Y, u_i^*, t_L, t_U, p_i) \quad (3)$$

subject to constraints:

$$\dot{X}(t) = A(p_i)X(t) + B(p_i)u(t) \quad (4)$$

$$Y(t) = C(p_i)X(t) + D(p_i)u(t) \quad (5)$$

$$X(0) = X_0, X_L(t) \leq X(t) \leq X_u(t) \quad (6)$$

$$g(X, Y, t, p) \leq 0 \quad (7)$$

$$t_L \leq t \leq t_U \quad (8)$$

where
$u_i^*$=optimal drive signal;
$p_i$=point in the dataset of parameters where i=1, . . . , N;
N=total number of points in the dataset of parameters;
$X_0$=initial state of logging tool 406;
$X_L(t)$=lower bound of the states at time t;
$X_u(t)$=upper bound of the states at time t;
$t_L$=start time for damping out the vibration of logging tool 406; and
$t_U$=stop time for damping out the vibration of logging tool 406.

Equation 3 may calculate an optimal drive signal such that the undesired motion of logging tool 406 is minimized. The constraints provide limits on the values that logging tool modeling system 300 may calculate. For example, $t_L$ and $t_U$ provide limits on the amount of time that may elapse before the vibration of logging tool 406 is damped out. Logging tool 406 does not vibrate or oscillate before generating an acoustic signal. Therefore, the initial state of logging tool 406, $X_0$, may be zero. The function $g(X,Y,t,p) \leq 0$ is an additional constraint that may constrain the optimal drive signal to the desired frequency range for the particular subterranean operation. The function $J(X,Y,u_i^*,t_L,t_U,p_i)$ may be modeled offline such that the desired damping of logging tool 406 may be optimal when the function $J(X,Y,u_i^*,t_L,t_U,p_i)$ is minimized. The optimal drive signal may be a voltage or current that is sent to logging tool 406 to cause logging tool 406 to emit an acoustic signal while minimizing the vibration of logging tool 406.

Optimal drive signals dataset 402 may be stored in an organized pattern such as a matrix. The organized pattern may allow drive signal generator 404 to look up an optimal drive signal based on a given parameter or measurement. Optimal drive signals dataset 402 may be stored on logging tool modeling system 300 for offline use and/or may be stored on drive signal generator 404 for online use. The term "offline" may refer to the time period when logging tool 406 is not in operation and the term "online" may refer to the time period when logging tool 406 is performing a subterranean operation. The creation of optimal drive signals dataset 402 may be performed at the surface of a well site, for example by a component of logging facility 244 shown in FIG. 2; downhole, for example by a component of logging tool 406; or at a location away from the well site, for example at a remote computing facility.

Drive signal generator 404 may generate a drive signal to send to logging tool 406 by looking up the optimal drive signal in optimal drive signals dataset 402. To perform the look up, drive signal generator 404 may use the current measurements recorded in the wellbore or parameters based on current measurements recorded in the wellbore. For the first operation of logging tool 406, before logging tool 406 has recorded any measurements, an operator may select the starting parameters or measurements based on an initial wellbore environmental condition, such as the expected temperature or pressure in the wellbore. For subsequent operations, the parameters may be calculated by estimator 408. In some embodiments, parameters may not be used and the measurements recorded by logging tool 406 may be used by drive signal generator 404. Drive signal generator 404 may generate a voltage or current to send to logging tool 406 based on the optimal drive signal retrieved during the look up of the optimal drive signal for the given parameter or measurement. Drive signal generator 404 may be a component of control unit 134, as shown in FIG. 1, logging facility 244, as shown in FIG. 2, or a component of logging tool 406. Drive signal generator 404 may be located at the well site or downhole.

The drive signal may be sent to logging tool 406 and may cause logging tool 406 to generate an acoustic signal. The acoustic signal may propagate through the subterranean formation to at least one receiver, such as surface receiver 136, as shown in FIG. 1. The receiver may record the elapsed time between when the acoustic signal was emitted by logging tool 406 and when the acoustic signal was received by the receiver. The elapsed time may be used to calculate the speed of the acoustic signal through the subterranean formation. The calculated speed of the acoustic signal may be compared to known values for the speed of sounds through various types of rocks and fluid to determine the properties of the subterranean formation.

Logging tool 406 may be any suitable type of logging tool. For example, logging tool 406 may be a sonic logging tool including an actuator or a combination of an amplifier and a transmitter. In embodiments including an amplifier and a transmitter, the drive signal may be sent to the amplifier which may amplify the drive signal and send a signal to the transmitter. The transmitter may generate the acoustic signal.

When logging tool 406 emits an acoustic signal, components of logging tool 406 may be excited and may vibrate or oscillate. The frequency of the oscillations may be within the frequency range of the acoustic signal and may reduce the quality of the acoustic signal or may result in a longer operation period of logging tool 406. To reduce the impact of the oscillations, drive signal generator 404 may select the drive signal that will reduce the oscillations of the components of logging tool 406.

Logging tool 406 may record environmental measurements of the conditions of the wellbore surrounding logging tool 406. The environmental conditions may change the damping characteristics of logging tool 406 and the amount of oscillations caused by generating the acoustic signal. Environmental measurements may include any suitable measurement that may affect the dynamic response of logging tool 406, such as the ambient pressure or temperature in the wellbore.

In some embodiments, where optimal drive signals dataset 402 is based on measurements, the measurements recorded by logging tool 406 may be sent to drive signal generator 404. Drive signal generator 404 may generate the next drive signal to send to logging tool 406 based on looking up, in optimal drive signals dataset 402, the optimal drive signal that corresponds to the measurements.

In other embodiments, where optimal drive signals dataset 402 is based on parameters, the measurements recorded by logging tool 406 may be sent to estimator 408. Estimator 408 may convert the measurements into estimated parameters. Parameters may include any suitable parameters that may impact the dynamics of a logging tool, such as the resonance period of logging tool 406. For example, the ambient pressure, temperature, resonance frequency, or phase of the vibration may be used to calculate the resonance period of logging tool 406. The resonance period may be a parameter used to generate the optimal drive signal. Estimator 408 may send the estimated parameters to drive signal generator 404. Drive signal generator 404 may generate the next drive signal to send to logging tool 406 based on looking up, in optimal drive signals dataset 402, the optimal drive signal that corresponds to the estimated parameter. For example, drive signal generator may look up the optimal drive signal corresponding to the estimated resonance period of logging tool 406. Estimator 408 may be located at the well site or downhole in a component of logging tool 406.

In some embodiments, drive signal generator 404 may determine if the measurement or estimated parameter is outside of the range of measurements or parameters included in optimal drive signals dataset 402. If the measurement or estimated parameter is outside of the range of optimal drive signals dataset 402, drive signal generator 404 may send a signal to logging tool modeling system 300 to cause logging tool modeling system to calculate a new parameters database and update optimal drive signals dataset 402.

In some embodiments, drive signal generator 404 may only change the drive signal if the parameters or measurements deviate from the previously used parameter or measurement by a threshold amount selected by an operator. If the parameters or measurements deviate by more than the threshold amount, drive signal generator 404 may send an updated drive signal to logging tool 406 based on recorded measurements or estimated parameters. If the parameters or measurements do not deviate by more than the threshold amount, drive signal generator 404 may send the same drive signal to logging tool 406. The operations of drive signal generator 404, logging tool 406, and estimator 408 may be completed in real-time while logging tool 406 is performing a subterranean operation.

Figure 5:
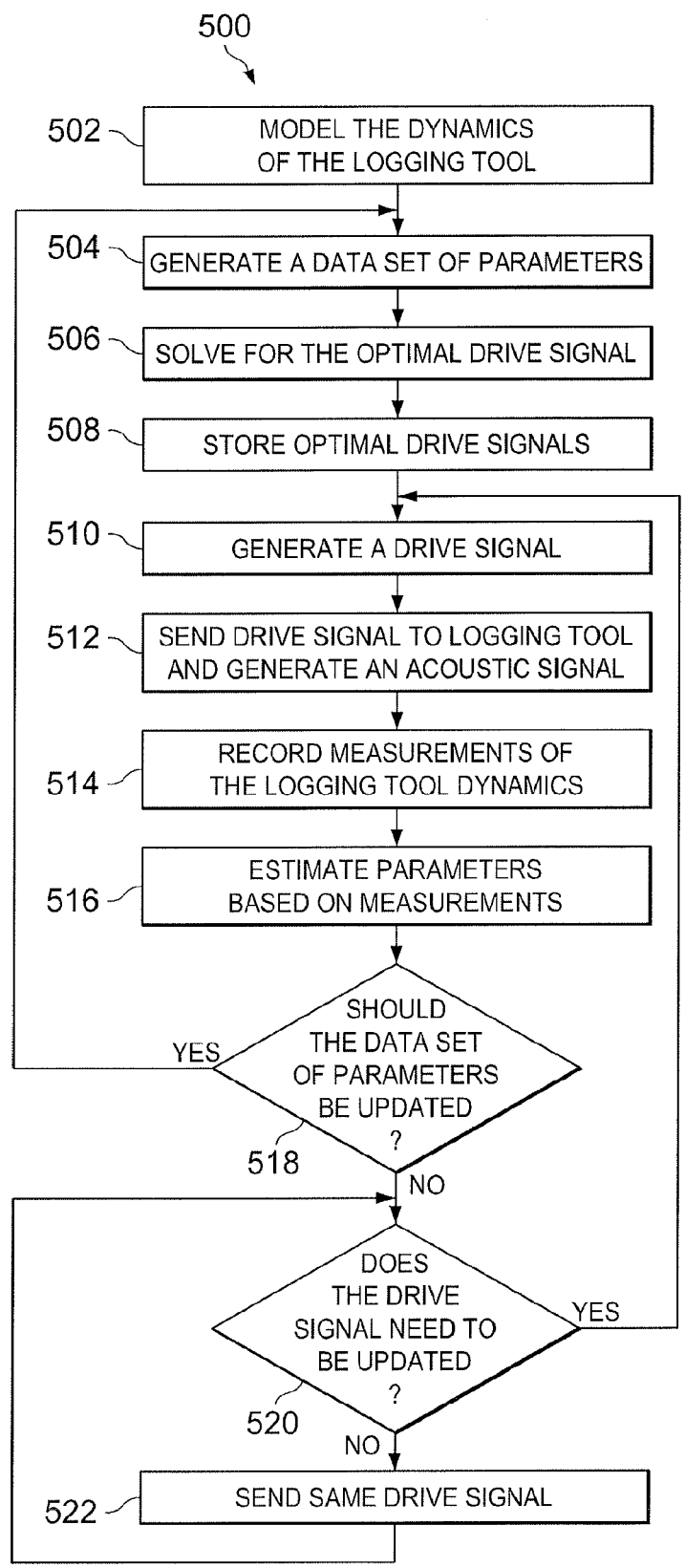
FIG. 5 illustrates a flow chart of a method of optimal vibration control for a wellbore logging tool, in accordance with some embodiments of the present disclosure.

FIG. 5 illustrates a flow chart of a method 500 for vibration control of a wellbore logging tool, in accordance with some embodiments of the present disclosure. The steps of method 500 may be performed by various computer programs, models or any combination thereof, configured to simulate and design drilling systems, apparatuses and devices, such as the logging tool modeling system illustrated in FIGS. 3 and 4. For illustrative purposes, method 500 is described with respect to the drilling or logging system as illustrated in the previous FIGURES; however, method 500 may be used to provide optimal vibration control for any logging tool in any drilling or logging system.

Method 500 may begin at step 502 where the logging tool modeling system may model the dynamics of a logging tool as a linear system. The model may be based on experimental results correlating the dynamics of the logging tool to input signals and an acoustic signal generated from an input signal (e.g., a drive signal). The dynamics of the logging tool may be represented in a variety of equivalent forms, such as by transfer functions or state space models. An example of a state-space representation is shown in Equations 1 and 2, as described with respect to FIG. 4.

A model of the dynamics of the logging tool may include the effects of properties of the logging tool, such as the damping ratio, stiffness, and/or the amplifier gain. The logging tool modeling system may choose an operating point around which to linearize the system and create the linear models of the logging tool. In embodiments where the dynamics of the logging tool may not be linear, the model may consist of discrete sets of linear equations across an operating range of the logging tool. The discrete equations may be combined to solve for an optimal drive signal in step 506.

In step 504, the logging tool modeling system may generate a database of parameters that cover a range of potential parameters of the logging tool. For example, the database may include a range of ambient pressures that may exist in a wellbore (e.g., wellbore 114a). The range of ambient pressures may be selected by the logging tool modeling system based on the expected conditions in the wellbore. In some embodiments, the database generated in step 404 may be a dataset of measurements instead of a dataset of parameters. A database of measurements may contain a set of potential measurements that may be recorded by the logging tool, as discussed in more detail with respect to step 514. A database of measurements may be used in the steps of method 500 in the same way a database of parameters may be used. In step 506, the logging tool modeling system may calculate for an optimal drive signal for the logging tool at each point in the database of parameters generated in step 504. The optimal drive signal, $u_i^*$, may be determined by using Equation 3, as described with reference to FIG. 4. The optimal drive signal may be a current or voltage sent to the logging tool to cause the logging tool to emit an acoustic tone while minimizing the vibrations of the logging tool.

The logging tool modeling system may use the database of parameters and the dynamics of the logging tool to calculate a dataset of optimal drive signals. A value for an optimal drive signal may be calculated for each value in the database of parameters.

At step 508, the logging tool modeling system may store the optimal drive signals calculated in step 506 in an organized pattern such as a matrix. The optimal drive signals may be stored such that a corresponding optimal drive signal may be retrieved for a given parameter. Steps 502-508 may be completed before the logging tool is in operation.

At step 510, the logging tool modeling system may generate a drive signal based on starting or estimated parameters. The starting or estimated parameters may be based on, or derived from, an estimated initial wellbore environmental condition, such as an estimated temperature in the wellbore, the pressure in the wellbore, the resonance frequency, or the phase of the vibration. For the first operation of the logging tool, an operator may select the starting parameters. For subsequent operations, the estimated parameters may be calculated in step 516. The starting or estimated parameters may be used to select an optimal drive signal from the dataset of optimal drive signals stored in step 508. By using a given starting or estimated parameter, the logging tool modeling system may search the stored dataset of optimal drive signals to perform a look-up of the optimal drive signal that was calculated, in step 506, for the given parameter. For example, if the given parameter is the resonance period of the logging tool, the logging tool modeling system may look up, in the dataset of optimal drive signals the optimal drive signal corresponding to the estimated resonance period of the logging tool. The drive signal may then be generated by producing a voltage or current to send to the logging tool.

At step 512, the logging tool modeling system may send a drive signal to the logging tool and the logging tool may generate an acoustic signal. For example, as shown in FIG. 1, control unit 134 may send a drive signal to logging tool 130. The drive signal sent to the logging tool may be the drive signal generated in step 510. The logging tool may generate an acoustic signal based on the drive signal and the acoustic signal may be used to determine the properties of the subterranean formation, as described with respect to FIG. 4. The process of generating an acoustic signal may cause one or more components of the logging tool to oscillate and the drive signal is designed to minimize the oscillations caused by the acoustic tone generation process.

At step 514, the logging tool modeling system may record environmental measurements of the wellbore conditions surrounding the logging tool. The environment may change the damping characteristics of the logging tool. The recorded environmental measurements may include any suitable environmental measurements that may be recorded on the logging tool that may affect the dynamic response of the logging tool, such as the ambient pressure or temperature in the wellbore, the resonance frequency, or the phase of the vibration.

At step 516, the logging tool modeling system may estimate one or more parameters based on the measurements recorded in step 514. The estimation may be performed to translate the recorded environmental measurements into one or a set of parameters to be used to generate a drive signal in step 510. Parameters may include any suitable parameters that may relate to the dynamics of a logging tool, such as the resonance period of the logging tool. For example, the ambient pressure or temperature in the wellbore, the resonance frequency, and/or the phase of the vibration may be used to calculate the resonance period of the logging tool. The resonance period may be a parameter used to generate the optimal drive signal. If the dataset of parameters, generated in step 504, is a dataset of measurements, step 516 may not be necessary.

At step 518, the logging tool modeling module may determine if the dataset of parameters or measurements should be updated. If the estimated parameters or recorded measurements are not included in the database of parameters or recorded measurements generated in step 504, the logging tool modeling module may return to step 504 and generate a new dataset of parameters including the estimated parameter or measurement. Otherwise method 500 may proceed to step 520.

At step 520, the logging tool modeling system may determine whether the drive signal should be updated. The drive signal may be updated if the parameters estimated in step 516 vary from the parameters used to generate a drive signal in step 510. The logging tool modeling system may base the determination on whether the parameters estimated in step 516 deviate from the previously estimated parameters by a threshold amount. The threshold amount may be determined by an operator and may be based on an acceptable deviation from a previous parameter. If the drive signal is to be updated, method 500 may return to step 510 to generate a new drive signal based on the updated estimated parameters. If the drive signal is not updated, method 500 may proceed to step 522.

At step 522, the logging tool modeling system may send the same drive signal to the logging tool as was generated in step 510. In some embodiments, the same drive signal may be used when the estimated parameters are the same as the previous estimated parameters used to generate the drive signal. In other embodiments, the same drive signal may be used when the estimated parameters do not deviate by more than the threshold amount from the previous estimated parameters, as discussed in step 518. After the same drive signal has been sent to the logging tool, method 500 may return to step 520 to determine whether the drive signal needs to be updated after the logging tool generates a signal in response to the same drive signal. Steps 510-522 may be performed in real-time while the logging tool is operating. The steps of method 500 may be performed at the surface of the well site or downhole by a component of a logging tool. Steps 502-508 may also be performed away from the wellbore at a remote computing facility.

Modifications, additions, or omissions may be made to method 500 without departing from the scope of the present disclosure. For example, the order of the steps may be performed in a different manner than that described and some steps may be performed at the same time. Additionally, each individual step may include additional steps without departing from the scope of the present disclosure.

Figure 6:
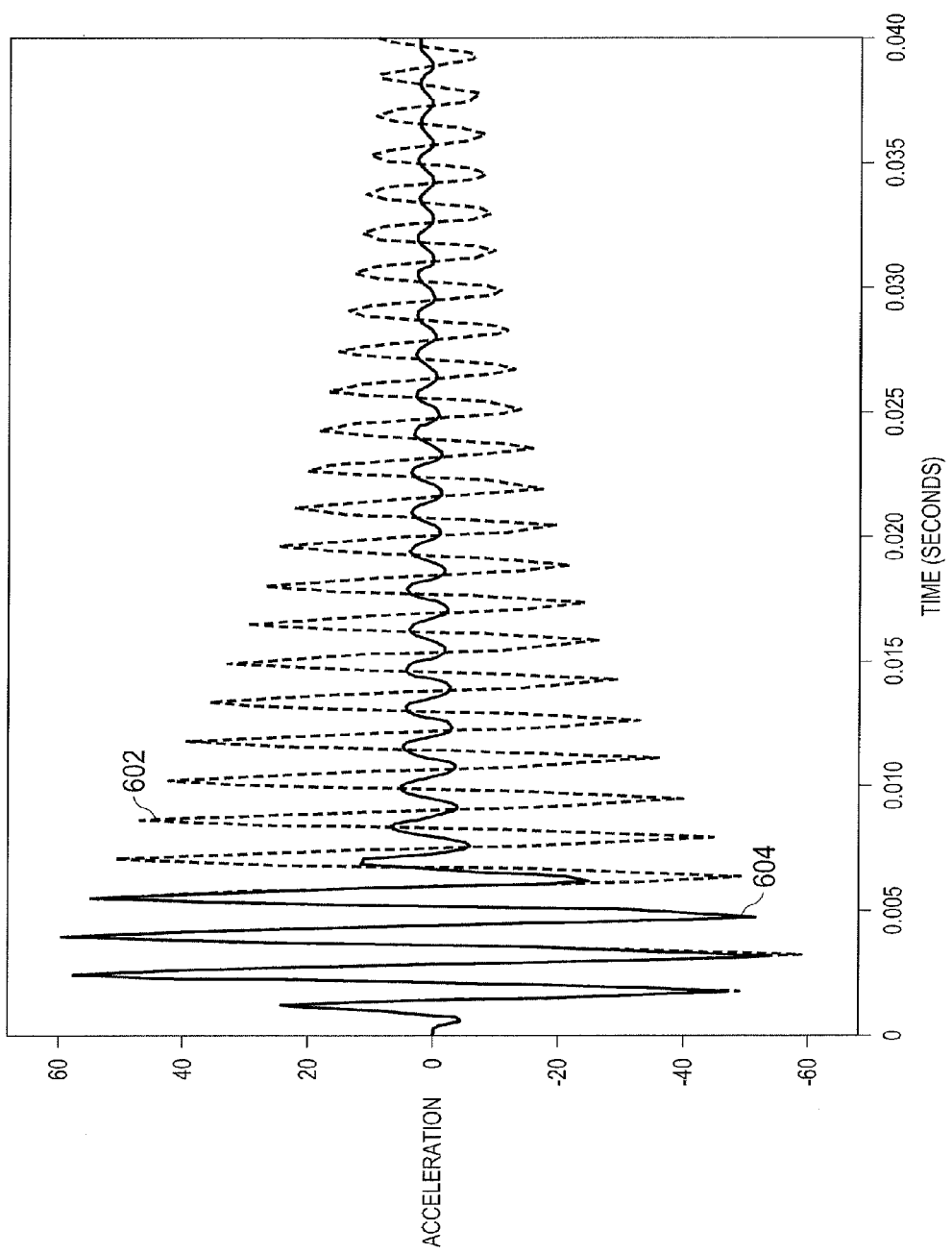
FIG. 6 illustrates the results from an exemplary embodiment of the method shown in FIG. 5, in accordance with some embodiments of the present disclosure.

FIG. 6 illustrates the results from an exemplary embodiment of method 500 as shown in FIG. 5, in accordance with some embodiments of the present disclosure. A simulation was performed comparing a logging tool without any damping control to a logging tool using the damping control method described with respect to FIG. 5. The vibration of the logging tool without any damping control, other than the inherent mechanical damping of the system, is shown by curve 602. The vibration of the logging tool with the disclosed damping control method is shown by curve 604. The logging tool with the disclosed damping control method exhibits reduced acceleration within less than 0.01-seconds while the logging tool without any damping control exhibits large amounts of acceleration for a longer period of time.

To provide illustrations of some embodiments of the present disclosure, the following examples are provided. In one embodiment, a method of optimal vibration control for a wellbore logging tool includes retrieving a plurality of optimal drive signals, obtaining an initial wellbore environmental condition, matching the initial wellbore environmental condition to an optimal drive signal stored in the plurality of optimal drive signals, and generating a drive signal for the wellbore logging tool based on the matching. Each of the optimal drive signals correspond to at least one of a plurality of wellbore environmental conditions and are calculated to minimize vibration of a wellbore logging tool.

In certain aspects of the disclosed method, the method may further include transmitting the drive signal to the wellbore logging tool, obtaining a subsequent wellbore environmental condition after the wellbore logging tool generates the drive signal, determining whether to update the drive signal for the wellbore logging tool based on the subsequent wellbore environmental condition, and selecting, based on the determination, an additional drive signal.

In other aspects of the disclosed method, the method may further include determining whether the subsequent wellbore environmental condition corresponds to a value in the plurality of optimal drive signals and calculating, based on the determination of whether the subsequent wellbore environmental condition corresponds to a value in the plurality of optimal drive signals, an additional plurality of optimal drive signals including an optimal drive signal corresponding to the subsequent wellbore environmental condition.

In one or more of the previously described aspects of the disclosed method, the method may further include a plurality of optimal drive signals corresponding to a plurality of parameters that affect dynamics of the wellbore logging tool. Each of the parameters may be based on at least one of a plurality of wellbore environmental conditions. The plurality of optimal drive signals may be based on a model of dynamics of the wellbore logging tool where the model may be represented as a state space model. The plurality of optimal drive signals may be based on modeling of dynamics of the wellbore logging tool. The modeling may include determining whether the wellbore logging tool behaves as a nonlinear system and estimating, based on the determination, the dynamics of the wellbore logging tool as a series of linear equations.

In one or more of the previously described aspects of the disclosed method, the method may further include where at least one of the steps of the method is performed in real-time while the wellbore logging tool is in operation. The method may further include measuring a condition in a wellbore to obtain an initial wellbore environmental condition.

In another embodiment, a method of optimal vibration control for a wellbore logging tool includes modeling dynamics of a wellbore logging tool, generating a dataset containing a plurality of possible wellbore environmental conditions, calculating a plurality of optimal drive signals for the wellbore logging tool, storing the plurality of optimal drive signals, obtaining an initial wellbore environmental condition, matching the initial wellbore environmental condition to an optimal drive signal stored in the plurality of optimal drive signals, and generating a drive signal for the wellbore logging tool based on the matching. Each optimal drive signal corresponding to at least one of the plurality of possible wellbore environmental conditions so that vibration of the wellbore logging tool is minimized.

In certain aspects of the disclosed method, the method may further include transmitting the drive signal to the wellbore logging tool, obtaining a subsequent wellbore environmental condition after the wellbore logging tool generates the drive signal, determining whether to update the drive signal for the wellbore logging tool based on the subsequent wellbore environmental condition, and selecting, based on the determination, an additional drive signal.

In other aspects of the disclosed method, the method may further include determining whether the subsequent wellbore environmental condition corresponds to a value in the plurality of optimal drive signals and calculating, based on the determination of whether the subsequent wellbore environmental condition corresponds to a value in the plurality of optimal drive signals, an additional plurality of optimal drive signals including an optimal drive signal corresponding to the subsequent wellbore environmental condition.

In one or more of the previously described aspects of the disclosed method, the method may further include where the data set includes a plurality of parameters that affect dynamics of the wellbore logging tool. Each of the parameters may be based on at least one of a plurality of wellbore environmental conditions. The model of dynamics of the wellbore logging tool may be represented as a state space model. The modeling of the dynamics of the wellbore logging tool includes determining whether the wellbore logging tool behaves as a nonlinear system and modeling, based on the determination, the dynamics of the wellbore logging tool as a series of linear equations.

In one or more of the previously described aspects of the disclosed method, the method may further include where at least one of the steps of the method may be performed in real-time while the wellbore logging tool is in operation. The method may measure a condition in a wellbore to obtain an initial wellbore environmental condition.

In yet another embodiment, a wellbore logging tool system includes a processor, a memory, and a logging tool modeling module. The logging tool modeling module may be operable to retrieve a plurality of optimal drive signals, obtain an initial wellbore environmental condition, match the initial wellbore environmental condition to an optimal drive signal stored in the plurality of optimal drive signals, and generate a drive signal for the wellbore logging tool based on the matching. Each of the optimal drive signals may correspond to at least one of a plurality of wellbore environmental conditions and may be calculated to minimize vibration of a wellbore logging tool.

In certain aspects of the disclosed system, the logging tool modeling module may further be operable to transmit the drive signal to the wellbore logging tool, obtain a subsequent wellbore environmental condition after the wellbore logging tool generates the drive signal, determine whether to update the drive signal for the wellbore logging tool based on the subsequent wellbore environmental condition, and select, based on the determination, an additional drive signal.

In other aspects of the disclosed system, the logging tool modeling module may further be operable to determine whether the subsequent wellbore environmental condition corresponds to a value in the plurality of optimal drive signals and calculate, based on the determination of whether the subsequent wellbore environmental condition corresponds to a value in the plurality of optimal drive signals, an additional plurality of optimal drive signals including an optimal drive signal corresponding to the subsequent wellbore environmental condition.

In one or more of the previously described aspects of the disclosed system, the system may further include where the plurality of optimal drive signals corresponds to a plurality of parameters that affect dynamics of the wellbore logging tool. Each of the parameters may be based on at least one of a plurality of wellbore environmental conditions. The plurality of optimal drive signals may be based on a model of dynamics of the wellbore logging tool. The model may be represented as a state space model. The modeling of the dynamics of the wellbore logging tool may include determining whether the wellbore logging tool behaves as a nonlinear system and estimating, based on the determination, the dynamics of the wellbore logging tool as a series of linear equations. The logging tool modeling module may further be operable to measure a condition in a wellbore to obtain an initial wellbore environmental condition.

Although the present disclosure and its advantages have been described in detail, it should be understood that various changes, substitutions and alterations can be made herein without departing from the spirit and scope of the disclosure as defined by the following claims. For example, while the embodiment discussed describes calculation of the optimal drive signal based on estimated parameters, however the optimal drive signal may be calculated based on measurements recorded by the logging tool.

What is claimed is:

1. A method of optimal vibration control for a wellbore logging tool, the method comprising:
   retrieving a plurality of optimal drive signals, each of the optimal drive signals corresponding to at least one of a plurality of wellbore environmental conditions and calculated to minimize vibration of a wellbore logging tool;
   obtaining an initial wellbore environmental condition;
   matching the initial wellbore environmental condition to an optimal drive signal stored in the plurality of optimal drive signals; and
   generating a drive signal for the wellbore logging tool based on the matching.

2. The method of claim 1, further comprising:
   transmitting the drive signal to the wellbore logging tool;
   obtaining a subsequent wellbore environmental condition after the wellbore logging tool generates the drive signal;
   determining whether to update the drive signal for the wellbore logging tool based on the subsequent wellbore environmental condition; and
   selecting, based on the determination, an additional drive signal.

3. The method of claim 2, further comprising:
   determining whether the subsequent wellbore environmental condition corresponds to a value in the plurality of optimal drive signals; and
   calculating, based on the determination of whether the subsequent wellbore environmental condition corresponds to a value in the plurality of optimal drive signals, an additional plurality of optimal drive signals including an optimal drive signal corresponding to the subsequent wellbore environmental condition.

4. The method of claim 1, wherein the plurality of optimal drive signals corresponds to a plurality of parameters that affect dynamics of the wellbore logging tool, each of the parameters based on at least one of a plurality of wellbore environmental conditions.

5. The method of claim 1, wherein the plurality of optimal drive signals are based on a model of dynamics of the wellbore logging tool, the model represented as a state space model.

6. The method of claim 1, wherein the plurality of optimal drive signals are based on modeling of dynamics of the wellbore logging tool, the modeling including:
   determining whether the wellbore logging tool behaves as a nonlinear system; and
   estimating, based on the determination, the dynamics of the wellbore logging tool as a series of linear equations.

7. The method of claim 1, wherein at least one of the steps of the method is performed in real-time while the wellbore logging tool is in operation.

8. The method of claim 1, wherein obtaining an initial wellbore environmental condition includes measuring a condition in a wellbore.

9. A method of optimal vibration control for a wellbore logging tool, the method comprising:
   modeling dynamics of a wellbore logging tool;
   generating a dataset containing a plurality of possible wellbore environmental conditions;
   calculating a plurality of optimal drive signals for the wellbore logging tool, each optimal drive signal corresponding to at least one of the plurality of possible wellbore environmental conditions so that vibration of the wellbore logging tool is minimized;
   storing the plurality of optimal drive signals;
   obtaining an initial wellbore environmental condition;
   matching the initial wellbore environmental condition to an optimal drive signal stored in the plurality of optimal drive signals; and
   generating a drive signal for the wellbore logging tool based on the matching.

10. The method of claim 9, the method further comprising:
    transmitting the drive signal to the wellbore logging tool;
    obtaining a subsequent wellbore environmental condition after the wellbore logging tool generates the drive signal;
    determining whether to update the drive signal for the wellbore logging tool based on the subsequent wellbore environmental condition; and
    selecting, based on the determination, an additional drive signal based on the subsequent wellbore environmental condition.

11. The method of claim 10, the method further comprising:
    determining whether the subsequent wellbore environmental condition corresponds to a value in the plurality of optimal drive signals; and
    calculating, based on the determination of whether the subsequent wellbore environmental condition corresponds to a value in the plurality of optimal drive signals, an additional plurality of optimal drive signals including an optimal drive signal corresponding to the subsequent wellbore environmental condition.

12. The method of claim 9, wherein the dataset includes a plurality of parameters that effect dynamics of the wellbore logging tool, each of the parameters based on at least one of a plurality of wellbore environmental conditions.

13. The method of claim 9, wherein the model of dynamics of the wellbore logging tool is a state space model.

14. The method of claim 9, wherein modeling dynamics of the wellbore logging tool further includes:
    determining whether the wellbore logging tool behaves as a nonlinear system; and
    modeling, based on the determination, the dynamics of the wellbore logging tool as a series of linear equations.

15. The method of claim 9, wherein at least one of the steps of the method is performed in real-time while the wellbore logging tool is in operation.

16. The method of claim 9, wherein obtaining an initial wellbore environmental condition includes measuring a condition in a wellbore.

17. A wellbore logging tool system, the system comprising:
- a processor;
- a memory; and
- a logging tool modeling module operable to:
  - retrieve a plurality of optimal drive signals, each of the optimal drive signals corresponding to at least one of a plurality of wellbore environmental conditions and calculated to minimize vibration of a wellbore logging tool;
  - obtain an initial wellbore environmental condition;
  - match the initial wellbore environmental condition to an optimal drive signal stored in the plurality of optimal drive signals; and
  - generate a drive signal for the wellbore logging tool based on the matching.

18. The system of claim 17, the logging tool modeling module further operable to:
- transmit the drive signal to the wellbore logging tool;
- obtain a subsequent wellbore environmental condition after the wellbore logging tool generates the drive signal;
- determine whether to update the drive signal for the wellbore logging tool based on the subsequent wellbore environmental condition; and
- select, based on the determination, an additional drive signal.

19. The system of claim 17, the logging tool modeling module further operable to:
- determine whether the subsequent wellbore environmental condition corresponds to a value in the plurality of optimal drive signals; and
- calculate, based on the determination of whether the subsequent wellbore environmental condition corresponds to a value in the plurality of optimal drive signals, an additional plurality of optimal drive signals including an optimal drive signal corresponding to the subsequent wellbore environmental condition.

20. The system of claim 17, wherein the plurality of optimal drive signals corresponds to a plurality of parameters that affect dynamics of the wellbore logging tool, each of the parameters based on at least one of a plurality of wellbore environmental conditions.

21. The system of claim 17, wherein the plurality of optimal drive signals are based on a model of dynamics of the wellbore logging tool, the model represented as a state space model.

22. The system of claim 17, wherein the plurality of optimal drive signals are based on modeling of dynamics of the wellbore logging tool, the modeling including:
- determining whether the wellbore logging tool behaves as a nonlinear system; and
- estimating, based on the determination, the dynamics of the wellbore logging tool as a series of linear equations.

23. The system of claim 17, wherein obtaining an initial wellbore environmental condition includes measuring a condition in a wellbore.

* * * * *